United States Patent [19]

Eijadi et al.

[11] Patent Number: 4,593,976

[45] Date of Patent: Jun. 10, 1986

[54] SOLAR ILLUMINATION DEVICE

[75] Inventors: David A. Eijadi, St. Paul; David J. Bennett, Minneapolis, both of Minn.

[73] Assignee: Bennett, Ringrose, Wolsfeld, Jarvis, Gardner, Inc., Minneapolis, Minn.

[21] Appl. No.: 737,030

[22] Filed: May 22, 1985

[51] Int. Cl.[4] ........................ G02B 17/00; G02B 27/00

[52] U.S. Cl. .................................... 350/260; 126/452; 350/264

[58] Field of Search ............... 350/258, 260, 261, 452, 350/259; 126/422, 435, 426, 440, 452, 417; 60/641.15; 136/246, 206

[56] References Cited

U.S. PATENT DOCUMENTS

| | | | |
|---|---|---|---|
| 593,045 | 11/1897 | Cummings | 350/261 |
| 755,196 | 3/1904 | Wadsworth | 350/260 |
| 755,197 | 3/1904 | Wadsworth | 350/260 |
| 1,101,001 | 6/1914 | Willsie | 60/641.15 |
| 1,130,871 | 3/1915 | Willsie | 126/422 |
| 2,958,259 | 11/1960 | Ewing | 350/259 |
| 3,125,091 | 3/1964 | Sleeper, Jr. | 126/426 |
| 3,915,148 | 10/1975 | Fletcher et al. | 126/422 |
| 4,056,094 | 11/1977 | Rosenberg | 126/440 |
| 4,069,812 | 1/1978 | O'Neill | 136/246 |
| 4,089,594 | 5/1978 | Ewin | 350/262 |
| 4,108,540 | 8/1978 | Anderson et al. | 350/452 |
| 4,116,223 | 9/1978 | Vasilantone | 126/435 |
| 4,124,017 | 11/1978 | Paull | 126/440 |
| 4,147,561 | 4/1979 | Knight | 136/206 |
| 4,329,021 | 5/1982 | Bennett et al. | 350/259 |
| 4,337,754 | 7/1982 | Conger | 350/264 X |
| 4,349,245 | 9/1982 | Kliman | 350/264 |
| 4,351,588 | 9/1982 | Züllig | 350/259 |

OTHER PUBLICATIONS

Progressive Architecture, Apr. 1984, pp. 6 and 9.

"Passive Optical Solar Tracking System," by McCluney, *Applied Optics*, vol. 22, No. 21, Nov. 1983, pp. 3433–3439.

The Japanese Engineering Illuminating Institute publication vol. 65, No. 10 (1981).

"Design and Demonstration of Innovative Daylighting Strategies, Inc., Nottingham Public School, Syracuse, N.Y.," Arsenault & Kinney date unknown, but believed to be 1984 or 1985.

"The Variable-Area, Light-Reflecting Assembly (VALRA)" by Howard, pp. 209–216 (later than Feb. 1984).

"Transmission of 3-D Images by Means of Lens Guides," by Duguay & Aumiller, *Applied Optics*, vol. 18, No. 12, Jun. 15, 1979.

"Solar Electricity: The Hybrid System Approach," by Duguay, *American Scientist*, vol. 65, No. 4, Jul.–Aug. 1977, pp. 422–427.

"Lighting with Sunlight Using Sun Tracking Concentrators," by Duguay and Edgar, *Applied Optics*, vol. 16, No. 5.

*Primary Examiner*—Richard A. Wintercorn

*Attorney, Agent, or Firm*—Merchant, Gould, Smith, Edell, Welter & Schmidt

[57] ABSTRACT

A solar concentrator having a stationary reflective collector (20) located to view the sky and reflect solar energy to a stationary reflective reflector (30) positioned to receive such reflected energy and reflect the energy toward a target within a structure through a side wall (19). A low angle shield (32) prevents most direct rays from entering, unreflected, into a work space inside the structure and a shield (36) prevents solar energy, reflected by the collector (20) and the reflector (30) from penetrating a plane (38) space above the floor a distance generally equal to the height of the eye of an occupant standing on the floor of the structure.

18 Claims, 12 Drawing Figures

10
12
14
16
18
19
20
22
24
26a
26b
27
28
30
32
34
36
38
40
56
57
59

FIG. 3
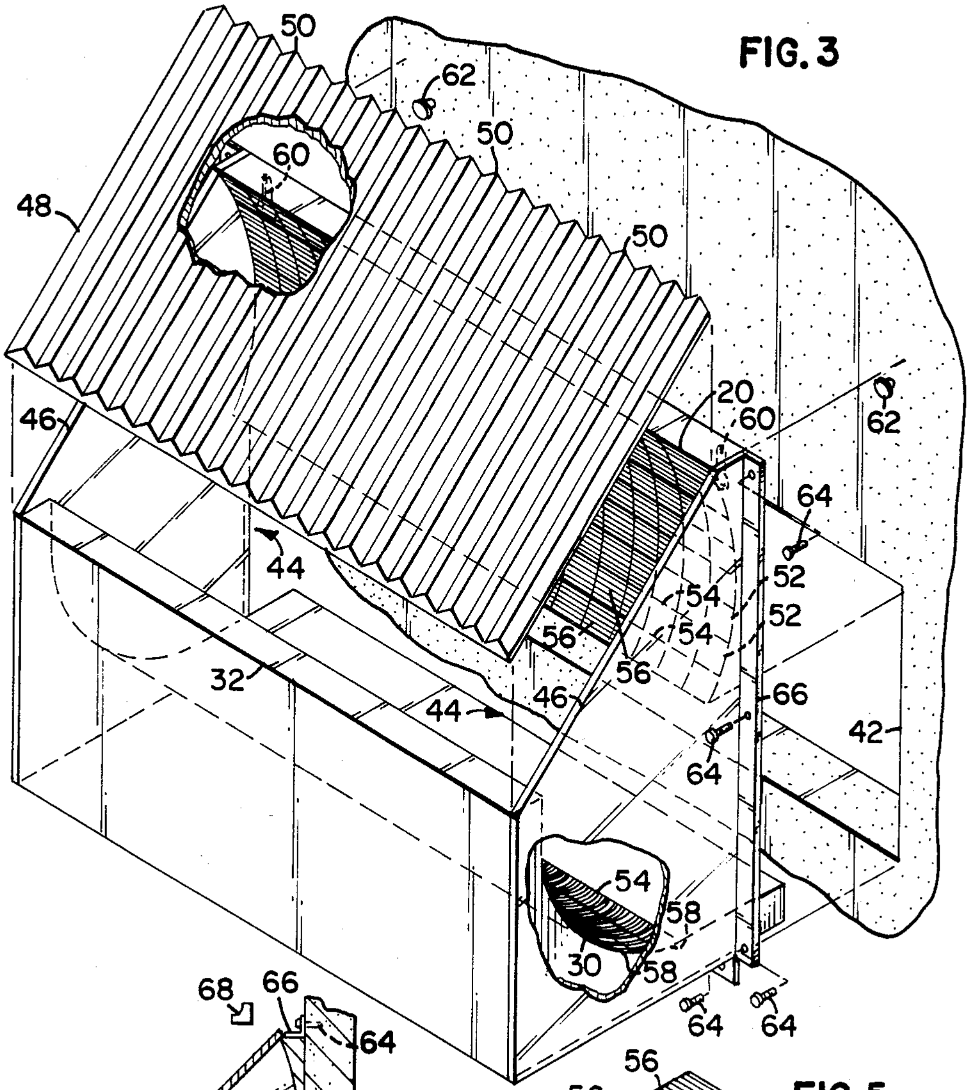
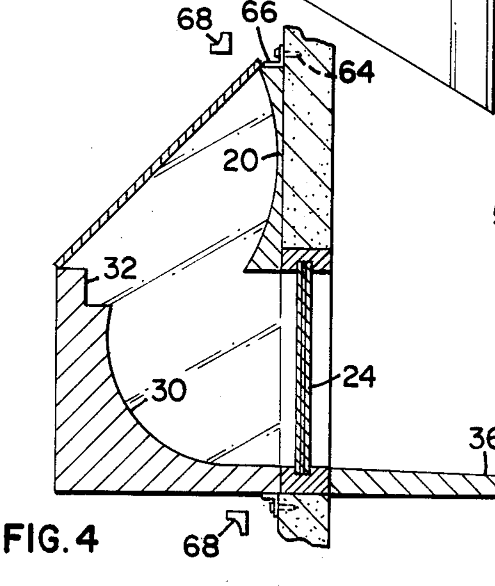
FIG. 4
FIG. 5
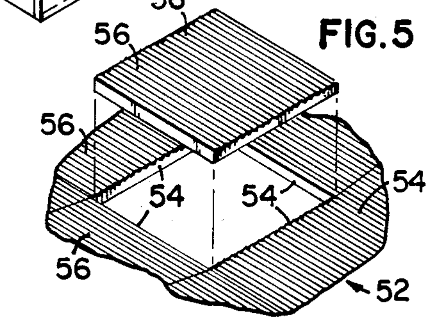

SOLAR ILLUMINATION DEVICE

TECHNICAL FIELD

The present invention relates to an apparatus for concentrating and collecting solar energy for illumination purposes within a structure. More particularly, the invention relates to a stationary device which illuminates an interior space through a side wall.

BACKGROUND

The use of solar energy for interior illumination has been understood for centuries. Common window glass, and sky lights are known to virtually all styles of architecture and building design. Solar tracking devices have been used to illuminate interior areas. These devices require mechanical tracking systems for following the sun's apparent motion across the sky. Stationary light shelves extending outwardly away from building side windows have also been used to increase solar illumination.

Refractive systems are also known to increase solar illumination within a building. An example of such a system is disclosed in the present inventor's prior patent (U.S. Pat. No. 4,329,021, issued May 11, 1982). A nontracking reflective structure for vertically illuminating an interior space is also disclosed at the University of Minnesota Civil/Mineral Engineering Building in Minneapolis, Minn. This device has two generally horizontally extending reflective surfaces and provides diffuse solar illumination through the roof.

The present invention provides solar illumination through a side wall, and is capable of illuminating a large area such as a warehouse, or commercial space. The device allows solar illumination to effectively illuminate each floor of a multifloor building, which is difficult or impossible with a vertical system. The present invention is believed to be a true advance in the state of the art as its structure and installation are simple, economical, and versatile. Within the concept of the present invention, the installation of a concentrator for a given latitude is straight forward. A number of structures are present which allow the intensity of illumination to be controlled.

SUMMARY OF THE INVENTION

The present invention is an apparatus for concentrating, and reflecting solar illumination for use in the interior of a building. The collector is made of a number of individual components. A stationary reflective collector is installed longitudinally above a window or opening in the building and is positioned to view the sky. A stationary reflector, again installed longitudinally on the outside of a building and positioned to receive direct solar energy reflected by the collector directs the sun's energy toward a target within the structure. A low angle shield prevents direct solar rays from entering, unreflected, into the structure between the collector and reflector so as to penetrate a horizontal plane a given distance from the floor. A shield extends generally horizontally and inwardly from the bottom of the reflector. This structure prevents direct rays reflected by the collector and reflector from penetrating the given horizontal plane. The given horizontal plane is typically spaced above the floor of the structure substantially the distance of the eye of an occupant standing on the floor. A plurality of such devices can be installed on successive floors of a building, with each device illuminating its respective floor area.

The apparatus may further include a fresnel lens positioned between the collector and the sky to increase the solar azimuth angle of radiation which reaches the collector. Further, end mirrors can be positioned against the ends of the collector/reflector pair to again increase the solar azimuth angle of light which enters the structure. The reflective surfaces of the collector and reflector can be curved, or may be created in the shape of a compound plane having two, three, four or more planar surfaces. Each such planar surface may be in the shape of a planar strip positioned to run along the length of the surface. Each strip may be made of individual tiles. The reflective surfaces themselves, may include dispersion increasing striations. A high angle shield and low angle reflector may be installed to modify the intensity of illumination at certain solar angles, and the ceiling of the structure may be a reflective or bright surface. A number of opaque or translucent baffles may be installed within the area to further prevent reflected illumination from penetrating the predetermined horizontal plane above the floor.

BRIEF DESCRIPTION OF THE DRAWINGS

FIG. 3 is a front and left side perspective view on an enlarged scale of an installation of an alternative embodiment of the invention, with portions exploded away and broken away.

FIG. 4 is a fragmentary sectional view of a further alternative embodiment.

FIG. 5 is a partial perspective view of an alternative embodiment of the invention on an enlarged scale showing a plurality of individual tiles lying in a compound planar surface FIGS. *6a–6c* are partial elevational views on a further enlarged scale of alternative forms of the reflective material shown schematically in FIG. 5.

DETAILED DESCRIPTION OF THE INVENTION

Figures 1, 2, 6A, 6B, 6C:
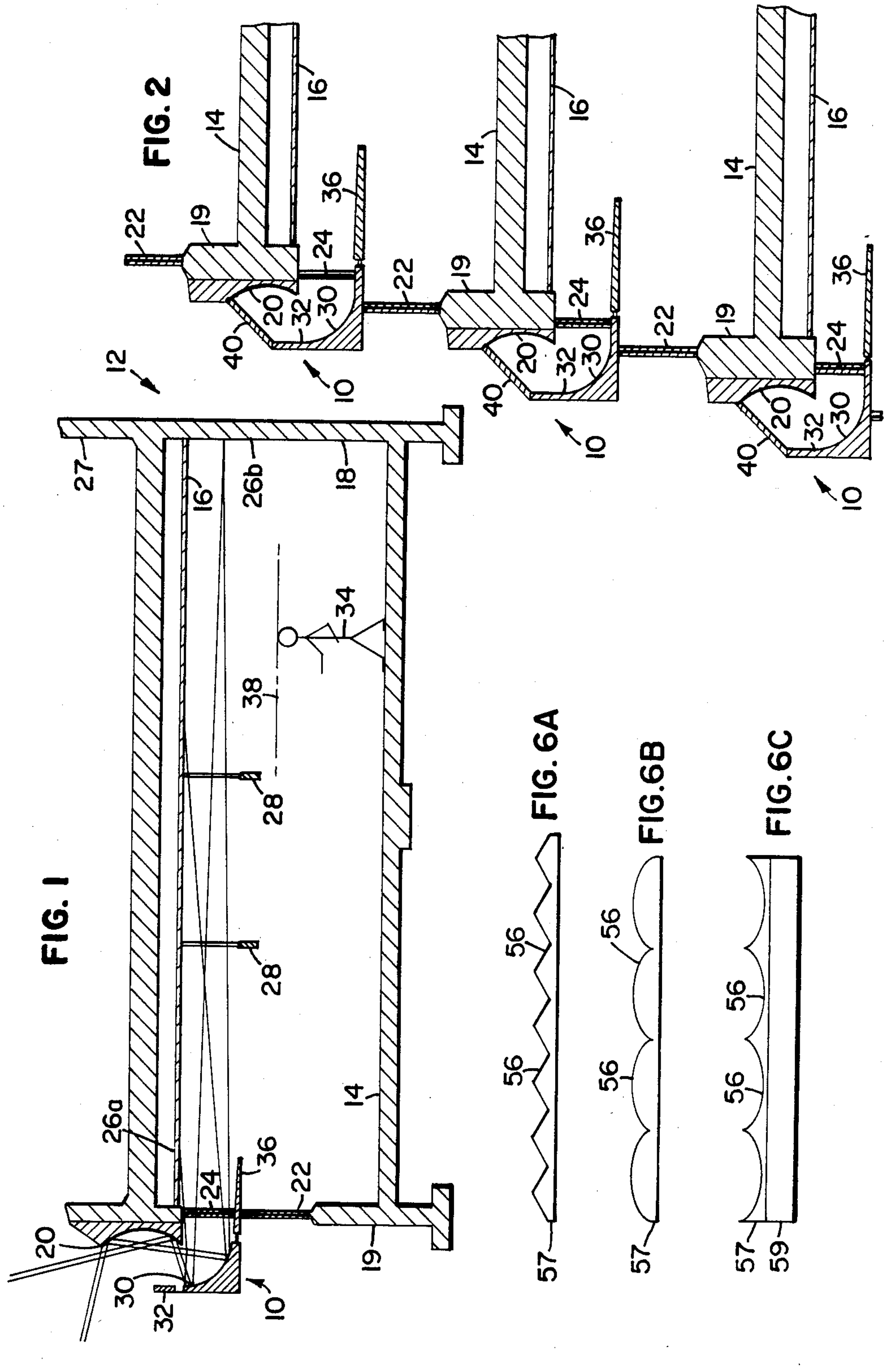
FIG. 1 is a partial sectional view of an installation of the present invention on the south wall of a structure.
FIG. 2 is a similar fragmentary sectional view showing the installation of three such devices in a multistory building.

Throughout the following discussion, certain terms shall be used to describe portions of the invention. These terms may be given their ordinary meaning as supplemented by the following definitions: collector; a reflective surface, on which direct solar rays are incident and reflected to a reflector. In the preferred embodiment of the invention the collector is an extended curved or compound planar surface lying generally on the exterior of a building above a solar window or access opening. The reflector is a reflective surface on which rays reflected by the collector are incident and reflected into a structure toward a target. In the preferred embodiment of the invention, the reflector is an extended curved or compound planar surface installed generally exterior of a building and positioned below the collector, opposite and spaced away from the solar window. The target is an area within the structure to be illuminated, which lies generally away from the solar window. In the preferred embodiment the target comprises an area on the back wall and ceiling of the structure. The target has an apparent center which lies in the plane of the back wall. The apparent center may be behind an opaque surface such as the ceiling when viewed from the reflector. The low angle shield is an opaque structure defining a boundary of the entrance aperture. In the preferred embodiment, the low angle shield is affixed to the reflector, just above its upper limit. The low angle shield prevents direct solar rays from entering, unreflected, into the structure between the collector and the reflector. The shield is an opaque structure having a reflective surface on the side nearest the reflector. In the preferred embodiment the shield extends generally horizontally from the bottom of the collector toward the target for a limited distance. The shield may be partially or completely inside the structure or may be completely outside. The purpose of the shield is to prevent reflected rays from being directed to an area within the structure where they may be directly received by the eye of an occupant standing on the floor of the structure. The reflective surface of the shield redirects such rays to the target area.

The combination of the reflector and collector form a trough area which may be bordered by end mirrors and/or one or more of the following: a snow cover or fresnel lens cover and a transparent thermal barrier in the solar window. These features improve the operation of the present invention, but are generally not required within the principles of the invention.

A general familiarity with the apparent position of the sun in the sky is presumed. The apparent solar angle is dependent on the time of day, the season of the year, and the location of the observer on the earth. Within the following discussion, the solar zenith angle will be defined as the angle of solar elevation above the horizon. This angle is dependent on the latitude of the location from the equator and reaches its maximum value at noon on the day of the summer solstice. the solar azimuth angle is the angle of horizontal solar deviation measured from a horizontal line extending perpendicularly from the collector. The value of this angle varies between the apparent angle of the sun at sunrise and sunset, and will differ throughout the year.

It should be noted that throughout this discussion, the invention will be described in reference to an installation on the south wall of a building in the northern hemisphere. As should be readily understood, the device can be advantageously installed on an east or west wall of a building to function during periods of the day when such a wall receives direct illumination. Installation on a north wall in the northern hemisphere is possible, but will not generally receive substantial amounts of direct radiation and will not generally produce bright illumination within the structure. Corresponding applications in the southern hemisphere are also possible.

Throughout the following description reference will be made to the drawings and the same numerals will be used throughout the several views to indicate the same or like parts of the invention.

Referring now to FIG. 1, the concentrator 10 includes a stationary reflective collector 20 positioned to view a portion of the sky. The collector 20 is installed on the exterior of a building 12 which includes a space to be illuminated having a floor 14, a ceiling 16, a back wall 18 and a front wall 19. The concentrator 10 is installed on a wall which includes vision glass 22, and a solar window 24. The collector 20 is a longitudinally extending generally curved or compound planar surface installed with its lower most region generally along the upper limit of the solar window 24.

The concentrator 10 also includes a stationary reflective reflector 30 positioned to receive direct solar energy reflected by the collector 20 so as to reflect such energy generally toward a target within the building 12. The target is generally a region of the ceiling 16 and the back wall 18 between the points **26*a* on the ceiling 16 and 26*b* on the back wall 18. The target has an apparent center at or near a point 27 on the back wall 18. The apparent center 27 is behind the opaque ceiling 16** when viewed from the reflector and is not visible from the reflector. Rays striking the target will be scattered or diffused by the target and will be of an intensity suitable for illumination of the work area within the building.

The reflector 30 is generally positioned outside of the building with a vertical dimension generally corresponding to the height of the solar window 24. The lower most portion of the reflector 30 is installed opposite the bottom of the solar window 24 with the upper most region of the reflector 30 horizontally spaced from the top of the solar window 24 and the bottom of the collector 20.

A low angle shield 32 is installed above the reflector 30. The low angle shield 32 serves as a means for preventing direct solar rays from entering the area to be illuminated without being reflected by the collector 10 and reflector 30. Such an unreflected ray could otherwise pass between the collector and reflector and could penetrate into the space so as to be perceived by the eye of an occupant 34 standing on the floor 14. Such a ray would be distracting to the occupant 34 as it would constitute an uncomfortable glare of bright illumination.

A shield 36 is also included in the concentrator 10. The shield 36 serves as a means for preventing direct rays reflected by the collector 20 and reflector 30 from penetrating the horizontal plane 38 spaced above the floor substantially equal to the height of the eye of an occupant 34 standing on the floor 14. The shield 36 has a reflective upper surface so as to reflect any rays incident upon it toward the target area between points **26*a* and 26*b***.

Also shown in FIG. 1 are two baffles 28 which comprise longitudinally extending opaque or translucent panels suspended from the ceiling 16. The baffles 28 are not essential to the operation of the device, yet they allow the shield 36 to be of a reduced dimension while effectively preventing reflected rays from penetrating the horizontal "eye level" plane 38.

In reference now to FIG. 2, a multistory installation is shown. Each floor 14 of the building includes a concentrator installed on an exterior wall. Each concentrator 10 provides illumination to the space on the floor on which it is installed.

Each story of the multilevel structure has a floor 14, a ceiling 16 and a front wall 19. Each front wall 19 has vision glass 22 and a solar window 24. A snow cover or angled transparent panel 40 may be installed at locations which receive appreciable annual snow falls. The snow cover 40 is installed along the length of the collector 20, spanning the space between the collector 20 and the low angle shield 32. The snow cover 40 keeps snow, dirt and debris off of the reflective surfaces.

In reference now specifically to FIG. 3, another embodiment of the present invention is shown. In this embodiment, the collector 20 and reflector 30 are only as long as the window 42 over which they are installed. This version of the invention may particularly be appropriate for retrofit applications or installation of the device on an older building not specifically designed for solar illumination. Because of the limited length of the 20 collector and reflector 30, the trough area 44 between these structures is bounded by a pair of inwardly facing reflective mirror end panels 46. These panels will increase the azimuth angle for solar illumination which can enter the window 42.

This embodiment further includes a solar azimuth angle increasing fresnel lens 48 affixed to lie over the entrance aperture of the device. In this embodiment, the entrance aperture is defined by the upper edges of the collector 20, the low angle shield 32 and the end panels 46. The lens 48 has a plurality of fresnel type ridges 50 which run from the upper limit of the low angle shield 32 to the upper limit of the collector 20. In this configuration, the zenith angle necessary for a ray to enter the building is substantially unaltered, while the azimuth angle from side to side or rays which will enter the building is substantially increased by the end panels 46 and the lens 48.

It should be noted that the collector in this embodiment is comprised of a compound planar form including eight rows or strips 52 of horizontally extending reflective material. Each strip 52 or row of material is itself comprised of a number of generally square planar tiles 54. Each such tile includes a number of striations 56 generally lying parallel to each other. These striations 56 serve to increase the angle of diversion of reflected rays. (See FIG. 5.).

As incoming solar illumination generally diverges at an angle of approximately ½ degree of arc, increasing this angle of divergence is important to prevent "oil canning" type reflected illumination. Striations of the type shown can readily increase this divergence to approximately 10°. As the striations on the collector 20 run generally horizontally, they increase the vertical divergence angle of the reflected light. The horizontal divergence remains generally unchanged by the striations on the collector 20.

The reflector 30 also includes striations 56 which run along the generally curved surface in a vertical direction. The reflector 30 is itself a compound planar structure having a number of horizontally extending strips 58 or rows each composed of planar square tiles 54. The striations on these reflector tiles run generally vertically on the reflector and serve to increase the horizontal divergence angle of the reflected illumination. The combination of horizontally oriented striations 56 on the collector 20 and vertically oriented striations 56 on the reflector 30 serves to increase the divergence of reflected illumination to a cone of illumination diverging at approximately 10° of arc from side to side and from top to bottom.

The embodiment shown in FIG. 3 includes an installation means having a key hole arrangement 60 for hanging the structure on a lug 62 and includes affixment bolts 64 and a flange or mounting bracket 66. This bracket may be covered with a molding 68 or other insulating material for aesthetic and energy conservation purposes (see FIG. 4.).

FIG. 4 shows a retrofit type installation similar to that shown in FIG. 3, although the surfaces shown in FIG. 4 are not compound planes. The collector 20 shown in FIG. 4 has a radius of curvature which curves more sharply toward the bottom. This can be described as an arc whose radius decreases from top to bottom as seen in FIG. 4. Similarly, the reflector 30 of FIG. 4 has a decreasing radius of curvature which decreases from bottom to top when viewed in FIG. 4. This curved surface can be comprised of a very large number of small planar tiles or a curved reflective surface.

In both FIGS. 3 and 4 there is no vision glass shown. In this type of installation, the occupant within the building could not normally see the horizon of objects outside of the building. FIG. 3 does not include a pane of glass installed in the window 42. Such a plane of glass is shown in FIGS. 1, 2 and 4 for example. The embodiment shown in FIG. 3 does not include a barrier between the interior space and the trough area 44. In this case the lens 48 serves as part of the thermal barrier between the interior and exterior of the structure.

FIGS. 6A, 6B, and 6C show alternative forms of the actual contour of the striations shown in FIGS. 3 and 5. The striations may be peaked (FIG. 6A) or convexly curved (FIG, 6B) or concavely curved (FIG. 6C). The striated surface 57 may be mounted on a backing 59 as shown in FIG. 6C. The reflective surface can also be "pebbled" (not shown in the drawings) which would simultaneously increase both the horizontal and vertical components of reflected rays. Suitable striated reflective material is commercially available from the 3M company in St. Paul, Minn.

SPECIFIC INSTALLATION GEOMETRY

Figure 7:
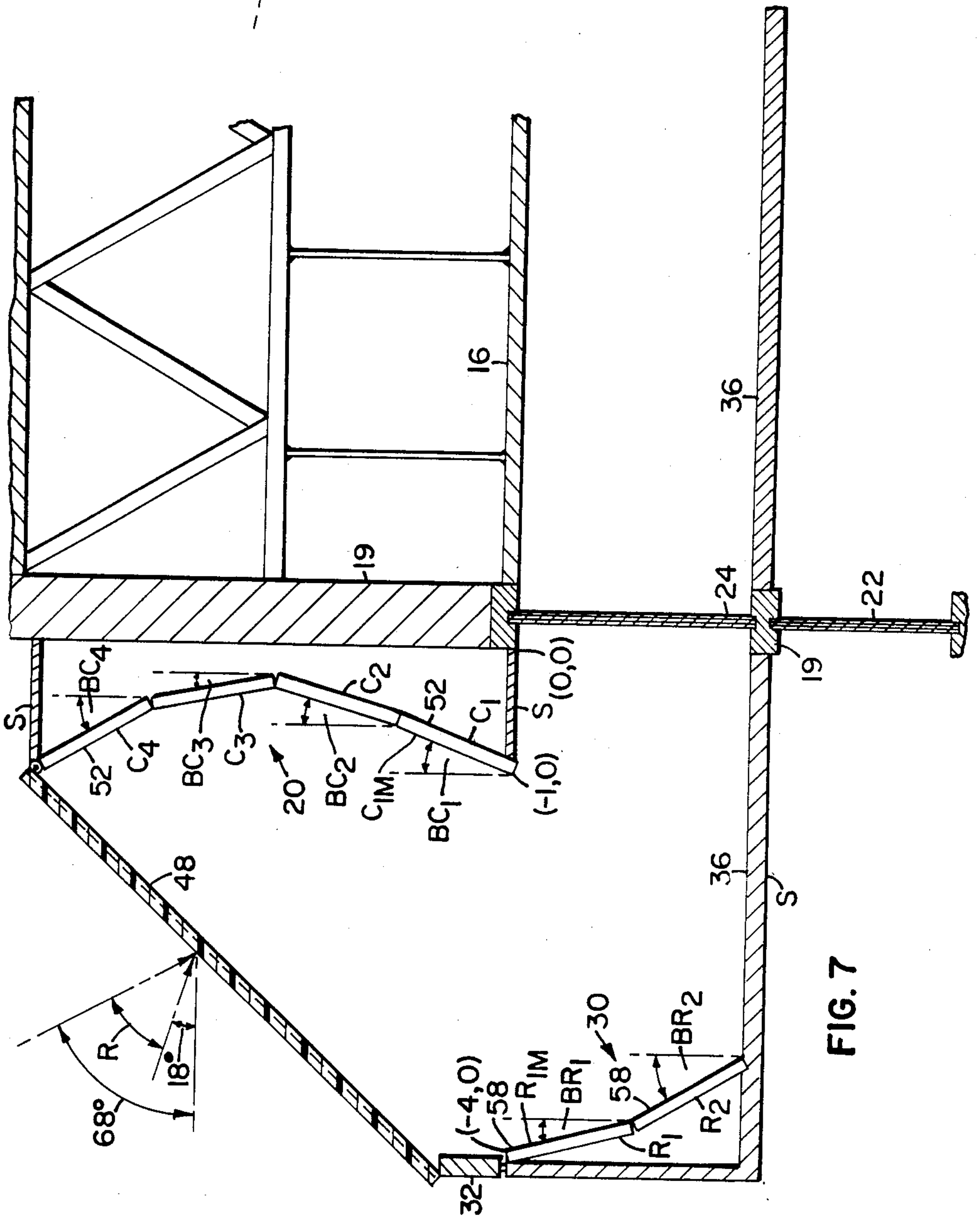
FIG. 7 is a partial sectional view of another embodiment of the invention installed on a south facing wall.

In reference now to FIG. 7, a specific installation for a site at a latitude of 45° north is shown. The installation is on a south wall which includes a solar window 24 and vision glass 22. The collector 20 includes four discrete planar strips 52 of reflective material designated $C_1$, $C_2$, $C_3$ and $C_4$. The planar surfaces are mounted in abutting relationship along their edges. Each strip of material is installed at an angle Beta with respect to the vertical. For example, the installation angle of $C_1$ is designated Beta $C_1$. The installation angle of each strip or row is different from the installation angle of the abutting strips or rows. Similarly, the installation angle for collectors $C_2$, $C_3$ and $C_4$ are designated as Beta $C_2$, Beta $C_3$ and Beta $C_4$.

In this embodiment, the reflector 30 comprises a compound planar surface having two planar strips 58 designated $R_1$ and $R_2$. The installation angles of these surfaces from the vertical have been designated as Beta $R_1$ and Beta $R_2$ respectively. The upper most limit of reflector strip $R_1$ lies generally horizontally spaced from the upper portion of the solar window 24 in a plane which includes the lower most limit of the collector strip $C_1$. As described above, each of the collector and reflector strips 58 are in abutting relationship and can be made of planar tiles affixed in side-to-side relationship. Such tiles may include striations which can run parallel to the strips (as shown in FIG. 5) or may run perpendicularly to the strips. FIG. 5 would show such an installation if each of the tiles were rotated 90° to that shown.

In reference again to FIG. 7 a low angle shield 32 is installed above the reflector 30 upper limit. A fresnel lens 48 is installed between the top of the low angle shield 32 and the upper most portion of the collector 20. A suitable structure (S) is included to affix the reflector and collector to the front wall 19. A shield 36 is installed between the lower most limit of the reflector 30 and the building wall 19. The shield 36 also extends inwardly from the bottom of the solar window 24.

The calculations for an installation at approximately 45° degrees north latitude are set forth below. Starting with a typical space to be illuminated, as a building having a south facing window or front wall 19 and a back or north wall approximately 40 feet therefrom, the size of the space to be illuminated is known. Assuming that vision glass 22 is installed in the south or front wall 19 from approximately 3 foot, six inches off the floor to approximately 7 feet off the floor, the solar window 24 can be installed between approximately 7 foot, six inches from the floor to approximately 9 foot, six inches off the floor.

For any given latitude, the maximum solar zenith during summer solstice and minimum solar zenith during winter solstice can be determined from solar tables. For an installation at approximately 45° north latitude a typical winter solstice zenith angle will be approximately 22½° degrees above the horizon. At such a location the summer solstice zenith angle will be approximately 68°. For such a sight, it is appropriate to concentrate and admit into the structure all direct solar rays having a zenith angle between 18° and 68° above the horizon. With this range (R) of solar acceptance, the concentrator will be operative on virtually all days of the year.

The collector 20 has four segments or collector strips 52 ($C_1$–$C_4$). Since it is anticipated that solar zenith angles between 18° and 68° will be accepted at this site, each of the four segments will generally be responsible for collecting approximately ¼ or one quartile of this 50° vertical spread of solar illumination (R). Consequently, each segment or strip 52 will be responsible for collecting and reflecting approxi mately 12½° of the vertical solar illumination.

For the purposes of understanding the relative positions of the components, the structure can be superimposed on an ordinant system having its origin (0,0) at the top outside corner of the solar window 24. The bottom most portion of the first collector panel $C_1$ can then be installed one unit away from the origin (−1,0). The units of measurement are purely arbitrary and are assumed to be the width of each strip 52 in the collector panel 20. The top portion of the first reflective strip $R_1$ is located three units south (−4,0) of the bottom of the first collector panel $C_1$.

The solar design angles Alpha 1, Alpha 2, Alpha 3 and Alpha 4 will represent the solar azimuth angle of a ray in the middle of each 12½ degree quartile of the total range (R) of vertical solar illumination. Since four collector segments are used, and the range (R) of solar rays to be collected has been chosen between 18° and 68°, Alpha 1=61.75°, Alpha 2=49.25°, Alpha 3=36.75°, and Alpha 4=24.25°. These figures were obtained by subtracting 6.25° from the 68° maximum solar angle (to calculate the solar angle of a midpoint ray within the first 12½ degree quartile of the total 50° spread) and then subtracting 12½ degrees from this midpoint ray to calculate each successive midpoint ray in the second, third and fourth quartiles of this 50° spread. The solar angles Alpha 1 through Alpha 4 will be used to determine the angle of installation of each segment of the collector 20 needed to reflect the midpoint ray within any given quartile to the desired portion of the reflector 30 for rereflection toward the target within the building.

It should be noted that the installation geometry set forth herein specifies specific installation angles for the collector rows 52 and the reflector rows 58. As the sun has an apparent motion through the sky which is continuous, the actual solar azimuth and zenith angles for incoming rays are constantly changing. Consequently, the actual path of incoming solar rays varies over time. The solar collector 10 will function throughout this period.

We know that for the installation shown in FIG. 7, the collector segment $C_1$ has a midpoint $C_{1M}$ lying on the ordinate system approximately at location (−1,+0.5). $C_{1M}$ represents the vertical midpoint of the horizontally extending surface $C_1$ shown in section in FIG. 7. All of the rows have such vertical midpoints. We also know that with this arrangement, the first segment of the reflector (placed three units to the south of the bottom of collector 1 has a midpoint $R_{1M}$ located approximately at ordinate (−4, −0.5). With the solar design angle Alpha 1=to 61.75 degrees we can determine the proper installation angle Beta $C_1$ for collector row $C_1$. It is desired to reflect this 61.75 degree ray from $C_{1M}$ to $R_{1M}$. Using trigonometry, the following formula applies.

$$\text{ARCTAN}\left(\frac{Y\,C_{1M} - Y\,R_{1M}}{X\,C_{1M} \times R_{1M}}\right)\ \text{PHI}\ C_{1M}R_{1M}$$

Here PHI $C_{1M}R_{1M}$=the angle from the horizontal of a ray which will travel from $C_{1M}$ to $R_{1M}$. Filling in the known approximate coordinates for $C_{1M}$ and $R_{1M}$ we can calculate PHI:

$$\text{ARCTAN}\left(\frac{.5-(-.5)}{-1-(-4)}\right) = \text{TAN}^{-1}\left(\tfrac{1}{3}\right) =$$

$$18.43° - \text{PHI}\ C_{1M}R_{1M}$$

We can round this angle to the nearest ½° so that PHI $C_{1M}R_{1M}$=18.5°.

Knowing this angle, the correct $C_1$ installation angle Beta $C_1$ is calculated as follows:

$$BC_1 = \frac{\text{ALPHA 1} - \text{PHI}\ C_{1M}R_{1M}}{2}$$

Where Alpha 1 is the angle of the incoming midray described above, Beta C1 is determined to be 21.625° which can be rounded to 21.5°. By convention, Beta will be measured from the vertical with the clockwise direction as positive and the counter clockwise direction as negative.

In order to calculate the installation or Beta angle for $R_1$ the apparent center of the target area must be selected. The target comprises the surface of the back wall and the ceiling to be illuminated. (See the area between points 26*a* and 26*b* in FIG. 1.). Generally, this area can be thought of as the area illuminated by a wedge of light spread by the collector/reflector pair and having a wedge spread angle of between 1½ and 2 times the solar segment (in this case 12½°). Since it is desirable to direct the incoming illumination above a plane substantially the height from the floor of the eye of an observer or occupant standing on the floor (plane 38 in FIG. 1), the reflected illumination should be aimed at an apparent target center which lies at a point on the back wall somewhat above the ceiling. A suitable location for the apparent center of the target can be found at coordinate (40,7) not shown in FIG. 7 due to space limitations, but shown approximately at point 27 in FIG. 1. Determination of the PHI angle for $R_1$ to aim the beam it receives from $C_1$ toward the center of the target is found with the following formula.

$$\text{PHI } R_1T = \text{ARCTAN}\left(\frac{7-(-.5)}{40-(-4)}\right) =$$

$$\text{TAN}^{-1}\left(\frac{7.5}{44}\right) = 9.67^\circ = 9.5^\circ$$

For this calculation the resulting 9.67° angle is rounded to 9.5°. The installation or Beta angle for $R_1$ is now calculable.

$$\text{BETA } R_1 = \frac{-\text{PHI } R_1T - \text{PHI } C_1 R_1}{2}$$

Beta $R_1$ is consequently:

$$\text{BETA } R_1 = \frac{-9.5^\circ - 18.5^\circ}{2} = -14^\circ$$

Thus, the installation angle for Beta $R_1$ is $-14°$.

Since the location of $C_1$ and $R_1$ have been chosen by placing the bottom edge of $C_1$ at location $(-1,0)$ and the top edge of $R_1$ at location $(-4,0)$, and we have calculated the installation angles for these components, it is now possible to calculate the location of the top edge of $C_1$, and bottom, edge of $R_1$.

$$C_{1TOP} = (-1, + \text{SIN Beta } C_1, 0 + \text{COS Beta } C_1) = (-.63), -93)$$

$$R_{1BOTTOM} = (-4 - (\text{SIN} - 9.5), 0 - (\text{COS} - 9.5)) = (-3.83, -.97)$$

With the top of $C_1$ and the bottom of $R_1$ known, calculation of the PHI and Beta angles for $C_2$ proceed in the same manner as set forth above. Alpha 2 is used for the calculations for $C_2$. The Alpha 2 ray is aimed at the midpoint of $R_1$. Beta $C_2$ works out to be 16.5°. By use of this angle and the exact position of $C_1$TOP, $C_2$TOP can be calculated. Using this point as the bottom for $C_3$, and using Alpha 3 as the incoming solar ray for $C_3$, PHI $C_3$ $R_2$ and Beta $C_3$ are calculated.

In this installation, $C_1$ and $C_2$ "aim" the Alpha 1 and Alpha 2 rays respectively at $R_1$. $C_3$ and $C_4$ "aim" Alpha 3 and Alpha 4 rays respectively at $R_2$. The installation or Beta angles of $R_1$ and $R_2$ are determined to reflect their respective incoming rays (reflected Alpha 1 and Alpha 2 for $R_1$, and reflected Alpha 3 and Alpha 4 for $R_2$) generally toward the midpoint (40,7) of the target. Performing these calculations, the geometry of an installation at latitude north 47° is set forth in FIG. 7 and the accompanying chart below.

$BC_1 = 21.5°$ $BC_2 = 16.5°$ $BC_3 = -10.5°$ $BC_4 = -29.5°$ $BR_1 = -14°$ $BR_2 = -30.5°$

It should be noted that it is entirely possible to have an equal number of collector segments and reflector segments. In such a case $C_1$ and $R_1$ would cooperate to aim Alpha 1 toward the target. $C_2$ would likewise cooperate with $R_2$ to aim Alpha 2 toward the target and so on. The number of actual collector segments and the number of actual reflector segments will determine the efficiency and cost of the actual installation.

Figure 8:
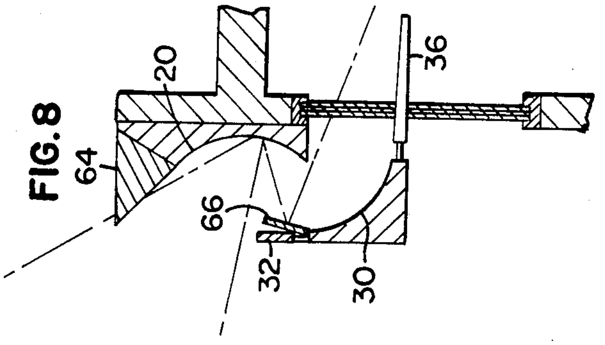
FIG. 8 is a partial sectional view of the present invention illustrating yet another embodiment.

Turning now to FIG. 8, an installation at a location closer to the equator is shown schematically. This installation has a collector 20 and reflector 30 pair, as well as a low angle shield 32 and a shield 36. A high angle shield 64 is also installed above the upper limit of the collector 20. The high angle shield 64 shades a portion of the collector 20 during periods of extreme high solar angle illumination. The high angle shield will serve to decrease the amount of incoming solar illumination during the warmest or hottest part of the day. This may be desirable to reduce the maximum incoming light between 11:00 a.m. and 1:00 p.m. during the summer months. The high angle shield will not shade the entire collector even during these periods and sufficient illumination will still be provided to the work space. During the winter months, the high angle shield 64 would not shade any portion of the collector 20 even at noon. Thus, the high angle shield is installed to seasonally modify the peak solar illumination within the structure.

FIG. 8 also illustrates a supplementary low angle reflector 66. This device is installed between the low angle shield 32 and the collector 20. The installation or Beta angle for the supplementary low angle reflector 66 is greater than that for the first segment of the reflector ($R_1$). The supplementary low angle reflector 66 serves to increase illumination entering the structure with low angle direct rays. This supplementary low angle reflector 66 will increase illumination in the early morning and particularly during winter months.

The combination of the high angle shield 64 and the supplementary low angle reflector 66 will serve to average out the illumination of the interior of the structure throughout the day and throughout the year.

Figure 9:
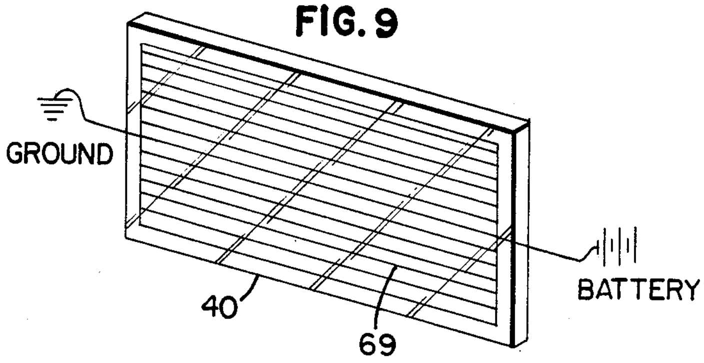
FIG. 9 is a schematic perspective view of a portion of the present invention showing still another optional embodiment.

FIG. 9 shows a further optional embodiment of the present invention. In this embodiment a heating element 69 is affixed to the snow cover 40. The heating element 69 can be embedded into the snow cover 40 or applied to the surface thereof. The heating element may operate on direct current or alternating current, and like the defroster unit common on many automobiles can melt outside snow and ice as well as vaporize condensation on either side of the snow cover. The heating element is made of electrically conductive material having enough resistance to generate heat, yet is of a small dimension so as not to interfere with the light transmitted through the snow cover 40. A similar heater can be installed on a lens cover 48.

Figure 10:
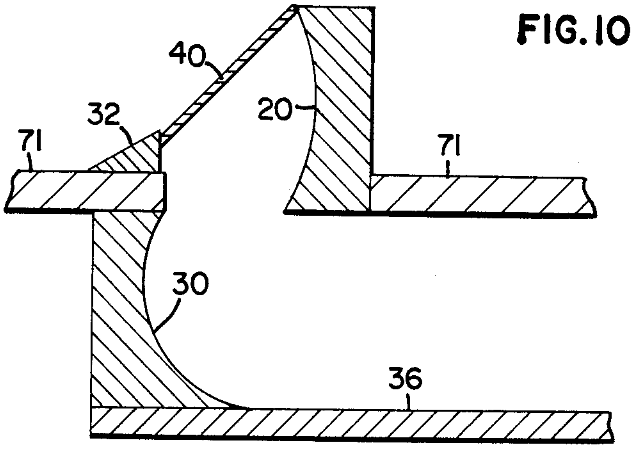
FIG. 10 is a partial sectional view of an installation of again another embodiment of the present invention.

FIG. 10 shows yet another installation of the present invention. Here the collector 20 and reflector 30 are installed on opposite sides of an extended opening in the roof 71 of a building. The installation includes a low angle shield 32 and a shield 36, as well as a snow cover 40. In this installation the snow cover serves as the thermal barrier between the interior of the structure and the outdoor environment.

It should be noted that with this type of installation, the solar energy transmitted through the roof 71 is cast primarily toward the right hand portion of the FIG. 10. Another installation of a device similar to that shown in FIG. 1 on the front wall of the structure can provide illumination from the front wall (not shown in FIG. 10)

of the structure to the area below the opening in the roof 71.

In fact, installations like that shown in FIG. 10 can be placed at intervals of every 80 to 100 feet from the front wall to illuminate interior areas of vast dimensions, all within the spirit and teaching of the present invention. Several embodiments of our invention have been set forth herein. In light of the above-teachings it will be appreciated that several variations of the disclosed embodiments are possible. For example, the selection of virtually any number of planar collector segments and planar reflector segments are possible. Similarly, use of a smoothly curced, longitudinally extending collector surface and a similar reflector surface are possible. The curvature of these surfaces and the angles of lines drawn tangent to the surfaces at given points can be calculated as set forth with respect to compound planar surface. Also, variations in the spacing of the reflective surfaces and attachment of lens or snow covers, low angle shields, secondary reflectors and shields and the like can be made. Further, the attachment and specific location of high angle shields, supplementary low angle reflectors, and baffles and the like can be made. Thus the invention is not to be construed as limited to the specific embodiments shown in the drawings but is to be limited only by the broad general meanings of the following claims.

We claim:

1. a solar concentrator for illuminating the interior of a building through a side wall thereof, said concentrator, comprising:

a stationary reflective collector located to view the sky and having a plurality of discrete planar collector surfaces mounted in abutting relationship, each said collector surface installed at an angle with respect to the vertical different from said angle of installation of said abutting collector surfaces;

a stationary reflective reflector positioned to receive direct solar energy reflected by said collector and oriented to reflect such energy toward a target within said building, said reflector having a plurality of discrete planar reflector surfaces each said reflector surface mounted in abutting relationship, each said reflector surface installed at an angle with respect to the vertical different from said angle of installation of said abutting reflector surfaces;

a low angle shield means for preventing direct solar rays from entering unreflected into said building between said collector and said reflector and penetrating a horizontal plane above the floor of said building, said horizontal plane spaced from said floor a distance substantially equal to the height of the eye of an occupant standing on the floor of said building, said low angle shield means including an opaque material and being affixed to said reflector; and a shield means for preventing rays reflected by said collector and said reflector from penetrating said horizontal plane, said shield means affixed to said building and extending in a generally horizontal direction.

2. A solar concentrator for illuminating a portion of the interior of a structure having a ceiling, a floor, and front, back and side walls, said concentrator comprising:

a stationary reflective collector positioned to view a portion of the sky, said collector affixed to the exterior of said building above a window, said window positioned on said front wall near said ceiling;

a stationary reflective reflector positioned to receive direct solar energy reflected by said collector and affixed in a position with its upper most limit substantially horizontally spaced from the lower most limit of said collector, so that said reflector reflects energy from said collector toward a target within said structure;

a low angle shield means for preventing direct solar rays from entering, unreflected into the structure between said collector and said reflector to penetrate a horizontal plane positioned above said floor a distance substantially equal to the height of the eye of an occupant standing on said floor, said low angle shield affixed to said reflector above said lower most limit of said collector; and a shield means for preventing direct rays reflected by said collector and said reflector from penetrating said horizontal plane, said shield means including a generally horizontally extending panel with a reflective upper surface, said panel affixed to said front wall just below said window.

3. The concentrator of claim 2 wherein said collector and reflector are each extended curved surfaces having ends, and further comprising a pair of end mirrors positioned adjacent said ends of said collector and reflector with the reflective sides facing toward said collector and reflector and substantially perpendicular to said front wall of said building.

4. The collector of claim 1 further comprising a fresnel lens positioned between said collector and the sun to increase the solar azimuth angle of direct rays which reach said collector.

5. The concentrator of claim 1 wherein said collector includes a plurality of dispersion increasing striations each lying substantially in a horizontal direction.

6. The concentrator of claim 1 wherein said reflector includes a plurality of dispersion increasing striations each lying substantially in a vertical plane.

7. The concentrator of claim 1 wherein said building further incudes a reflective ceiling.

8. The concentrator of claim 1 further comprising at least one baffle suspended at a distance from said ceiling substantially equal to the distance of said shield means from said collector, said baffle running substantially parallel to said side wall and being of a translucent or opaque material.

9. The concentrator of claim 1 further comprising a high angle shield means affixed above the upper limit of said collector for shading a portion of said collector during periods of high solar angle.

10. The concentrator of claim 1 wherein said reflective collector surface comprises a compound planar surface composed of individual planar reflective tiles.

11. The concentrator of claim 1 wherein said reflective reflector surface comprises a compund planar surface composed of individual planar reflective tiles.

12. The collector of claim 1 further comprising a supplementary low angle reflector having a reflective surface positioned generally between said low angle shield and said collector and installed at an angle with respect to the vertical greater than the angle with respect to the vertical of the upper most portion of said reflector.

13. A solar concentrator for illuminating the interior of a building with direct solar illumination from a range of illumination having a zenith angle between the maximum summer solstice zenith and less than the maximum winter solstice zenith angle, said concentrator comprising:

a stationary, longitudinally extended reflective collector having first, second, third and fourth discrete planar surfaces, each said surface installed in abutting relationship to the adjacent collector surface, each said surface being installed at an angle with respect to the vertical;

a stationary longitudinally extending reflective reflector having first and second discrete planar reflector surfaces, said reflector surface installed in abutting relationship and each reflector surface installed at an angle with respect to the vertical;

said first collector surface installed at an angle with respect to the vertical so as to reflect a direct ray within the middle of the upper most quartile of said range of illumination toward the vertical midpoint of said first reflector surface;

said second collector surface installed at an angle with respect to the vertical so as to reflect a direct ray within the middle of the second upper most quartile of said range of illumination toward the vertical midpoint of said first reflector surface;

said third collector surface installed at an angle with respect to the vertical so as to reflect a direct ray within the middle of the third upper most quartile of said range of illumination toward the vertical midpoint of said second reflector surface;

said fourth collector surface installed at an angle with respect to the vertical so as to reflect a direct ray within the middle of the fourth upper most quartile of said range of illumination toward the vertical midpoint of said second reflector surface;

said first reflector surface installed at an angle with respect to the vertical so as to reflect said reflected rays within said first and second quartile of said range of illumination generally toward the center of said target within said building; and said second reflector surface installed at an angle with respect to the vertical so as to reflect said reflected rays within said third and fourth quartile of said range of illumination generally toward the center of said target within said building.

14. The concentrator of claim 13 further comprising:

a low angle shield means for preventing direct solar rays from entering unreflected into said building between said collector and said reflector and penetrating a horizontal plane above the floor of said building, said horizontal plane spaced from said floor a distance substantially equal to the height of the eye of an occupant standing on the floor of said building, said low angle shield means including an opaque material and being affixed to said reflector.

15. the concentrator of calim 14 further comprising:

a shield means for preventing rays reflected by said collector and said reflector from penetrating said horizontal plane, said shield means including a panel affixed to said building and extending in a generally horizontal direction.

16. The concentrator of claim 15 further comprising a fresnel lens means including a lens positioned between the collector and the sun for increase the range of solar azimuth angles of direct rays which reach said collector.

17. The concentrator of claim 13 further comprising a plurality of dispersion increasing striations lying in a substantially horizontal direction on said collector surfaces.

18. the concentrator of claim 13 further comprising a plurality of dispersion increasing striations lying on a substantially vertical direction on said reflector surface.

* * * * *

UNITED STATES PATENT AND TRADEMARK OFFICE

CERTIFICATE OF CORRECTION

PATENT NO. : 4,593,976

DATED : June 10, 1986

INVENTOR(S) : David J. Bennett and David A. Eijadi

It is certified that error appears in the above-identified patent and that said Letters Patent is hereby corrected as shown below:

Column 4, line 33, "10" should be --20--;
Column 5, line 11, "20 collector" should be --collector 20--;
Column 5, line 26, "or" should be --of--;
Column 6, line 14, "of" should be --or--;
Column 9, line 37, after "(-.63" delete the parenthesis;
Column 11, line 13, delete "curced" and insert --curved--;
Column 11, line 29, delete "a" and insert --A--;
Column 12, line 42, "incudes" should be --includes--;
Column 13, line 12, "surface" should be --surfaces--;
Column 14, line 18, "the" should be --The--;
Column 14, line 18, "calim" should be --claim--;
Column 14, line 34, "the" should be --The--;
Abstract, line 11, "space" should be --spaced--.

Signed and Sealed this

Twenty-eighth Day of October, 1986

[SEAL]

*Attest:*

DONALD J. QUIGG

*Attesting Officer* *Commissioner of Patents and Trademarks*